INVENTORS
SAMUEL TARADASH &
NICHOLAS CHLUMECKY
BY their ATTORNEYS

April 7, 1970  S. TARADASH ET AL  3,504,499
LINING FOR SHAFTS, TUNNELS AND UNDERGROUND CHAMBERS
Filed Jan. 2, 1969  3 Sheets-Sheet 2
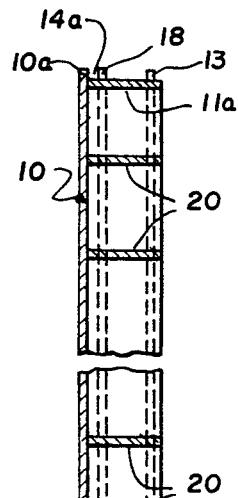
Fig.3.
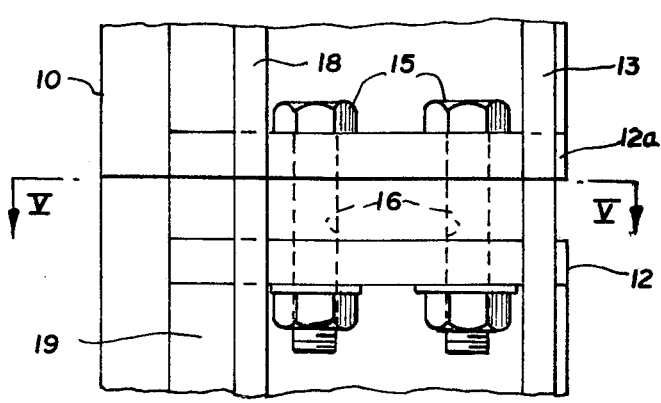
Fig.4.
Fig.5.
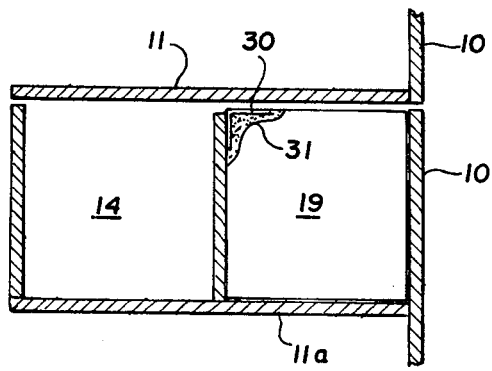
Fig.7.
INVENTORS
SAMUEL TARADASH &
NICHOLAS CHLUMECKY
BY
their ATTORNEYS

United States Patent Office 3,504,499
Patented Apr. 7, 1970

3,504,499
LINING FOR SHAFTS, TUNNELS AND UNDERGROUND CHAMBERS
Samuel Taradash, Liberty Township, Trumbull County, and Nicholas Chlumecky, Poland, Ohio, assignors to Commercial Shearing & Stamping Company, a corporation of Ohio
Continuation-in-part of application Ser. No. 647,128, June 19, 1967. This application Jan. 2, 1969, Ser. No. 788,469
Int. Cl. E21d 11/00
U.S. Cl. 61—45                               5 Claims

ABSTRACT OF THE DISCLOSURE

A lining and a liner plate for shafts, tunnels and underground chambers consisting of separate rectilinear arcuate members having radially inwardly extending flanges on all edges bolted together, said flanges being spaced on the arcuate members to form a substantially watertight closed well containing a chemical sealing agent and keeper under compression.

---

This application is a continuation-in-part of our co-pending application Ser. No. 647,128, filed June 19, 1967.

This invention relates to linings for shafts, tunnels and underground chambers and particularly to watertight steel lining for shafts, tunnels and underground chambers. The problems of providing a watertight underground lining have been recognized for many years by engineers and builders of tunnels, shafts and the like. For years people have been experimenting with various methods and materials to make a shaft or tunnel lining watertight. One of the great problems in all shaft and tunnel lining operations is that of sealing out water under low or very high pressures particularly at the joints between the members forming the lining.

In the field of tunnel lining, it has been the practice to drive the tunnel under compressed air to keep the water from entering the tunnel. This practice involves very substantial costs in addition to the mere cost of excavating and lining. For example, such a practice involves in addition (1) a plant with electrical substations to supply large quantities of compressed air pressure to the tunnel, (2) standby diesel power unit for the air supply, (3) a source of additional volume of air as the tunnel lengthens, (4) extra labor costs resulting from shorter shifts because of health hazards from the high air pressure and higher wage rates commanded by labor for the extra hazards involved, and (5) extra labor costs resulting from the longer time needed to erect reinforcing and pour permanent concrete linings at short intervals as is required when working under high air pressure as well as the disruption of normal mining and mucking cycles by these frequent concreting intervals, all of which labor rates are higher because of the health hazard under high pressure.

In the case of shaft sinking, the entry of water into the shaft requires pumping equipment and generally poor working conditions when large amounts of water enter the shaft. This is also true in the case of underground chambers.

In the past, attempts have been made to caulk a tunnel or shaft lining with lead caulking, asbestos rope or tar. These materials have been applied while the tunnel was being erected or were driven or injected into place after the lining was erected. Uniformly, these caulkings have met with little or no success for sealing linings permanently due to thermal expansion and contraction of the lining after it has been installed and also due to slight movement of the ground around the tunnel and vibrations which occur with heavy vehicular traffic.

In the case of shaft construction and mining, the excavation is often carried out in water bearing rock with water flows at high pressure. With shaft linings and underground chambers which are located at great depths, say 2000 feet or more, it was up to now not possible to seal the joints of segmental linings permanently. In the past, this was attempted by the use of lead gaskets, but with water pressures exceeding 1000 p.s.i. such lead gaskets extrude and high pressure segmental shaft linings require costly maintenance work to reduce the flow of water at assembly joints to tolerable quantities. Permanent exclusion of water is often impossible with methods known prior to this invention.

We have solved these problems of prior art shaft and tunnel lining by very simple expedients and have made it posible to mine tunnels or shafts using much smaller air volumes and to provide better control of concreting so that the entire concrete operation and clean-up is done in free air. Most importantly, however, the inflow of water under high pressure into deep shafts, tunnels or underground chambers is prevented permanently by the use of the invention. The invention is particularly useful for underground openings in rock formations where high pressure grouting is not effective.

Preferably we provide a shaft or tunnel liner made up of a plurality of rectilinear arcuate members having radially extending flanges on all edges adapted to be bolted together at said flanges, said flanges being spaced with respect to the edges so as to form a rectilinear substantialy closed well between the flanges of adjacent members, a chemical sealant confined in said well capable of swelling on contact with water into sealing engagement with at least a part of the well, said plurality of members being drawn together under pressure substantially to close the periphery of said well and a shim or keeper member at the junction of the members within the well bearing on a portion of each member at the junction, thereby sealing the adjacent edges together. Preferably the chemical sealant is a material which is confined under a compression load or which may be capable of swelling on contact with water to provide compressive loading and is retained within a fixed area of the well, the balance of the well being preferably filled with a flowable material resistant to water wetting although it may remain unfilled. Spaced reinforcing members are preferably fixed to the members on the external periphery to take edge to edge thrust.

In the foregoing general description we have set out certain objects, purposes and advantages of our invention. Other objects, purposes and advantages will be apparent from a consideration of the following specification and the accompanying drawings in which:

FIGURE 3 is a section on the line III—III of FIGURE 1;

FIGURE 4 is an enlarged segmental section through the assembled lining joint of FIGURE 1 on the line IV—IV;

FIGURE 5 is an enlarged segmental section of a lining joint on the line V—V of FIGURE 4;

FIGURE 7 is a sectional view through a second modification of liner joint according to our invention.

Figure 1:
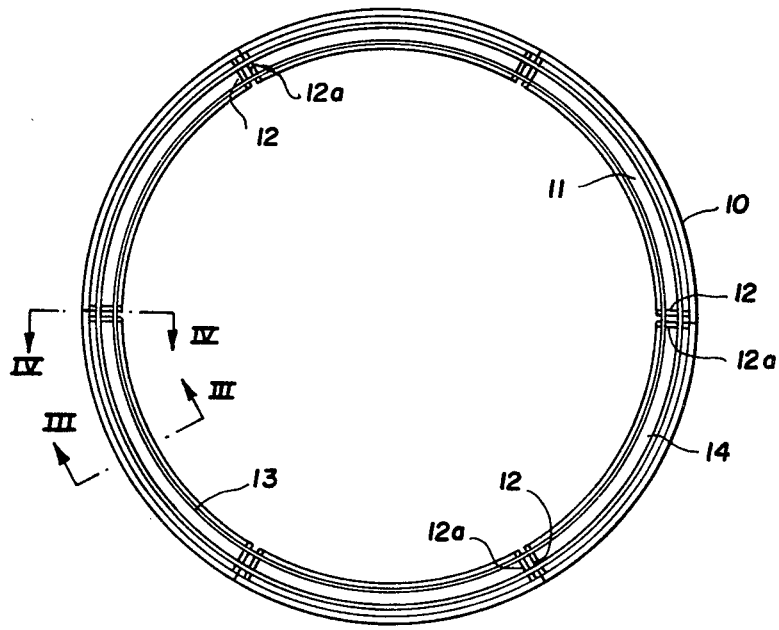
FIGURE 1 is an end elevational view of a liner plate assembly according to our invention.

Referring to the drawings we have illustrated an elongated rectilinear plate 10 bent to arcuate form and having arcuate side flanges 11 and 11a and end flanges 12 and 12a which extend radially inwardly on the plates 10. Each of the flanges 11a and 12a are spaced from the edge of plate 10 and are provided with a rib 13 at the end remote from plate 10 defining with the extending edge 10a and the flange, a groove or well 14. The flanges of adjacent plates are bolted together by bolts 15 passing through openings 16. The well 14 may be provided with an intermediate rib 18 dividing the well into two parts 14a and 14b. The portion 14a is filled with a chemical sealant member 19 which expands on contact with water such as Dowell "CSR" or other like water absorbing composition.

Strengthening members 20, in the form of radial ribs or other shapes, may be welded at spaced intervals between side flanges 11 and 11a to take the thrust of the earth or rock outside the tunnel lining.

In order to prevent extrusion of sealant, we insert at the joint line 19 between adjoining plates a stainless steel keeper or shim 21 which may be flat or bent as shown. This acts to prevent extrusion of sealant under the pressure of water or expanding sealant and eliminates the need for machined joining surfaces. Tests have shown that by this construction we are able to prevent inflow of water at pressures as high as 1500 p.s.i. on unmachined joints. This is unheard of in this industry and is a remarkable step forward in the solution to problems of tunneling and mining.

The segmental steel lining is preferably joined along the side edges by paired bolts as shown in FIGURE 5 and along the end edges by a single line of bolts, although this arrangement is not critical. The stiffeners are preferably used on the inside of the skin plates as shown to act as stiffeners for the plates.

Figure 2:
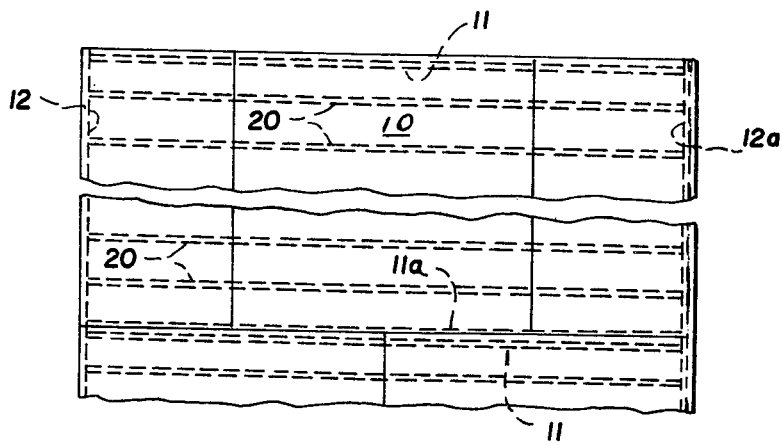
FIGURE 2 is a side elevation of the liner plate assembly of FIGURE 1.
Figure 6:
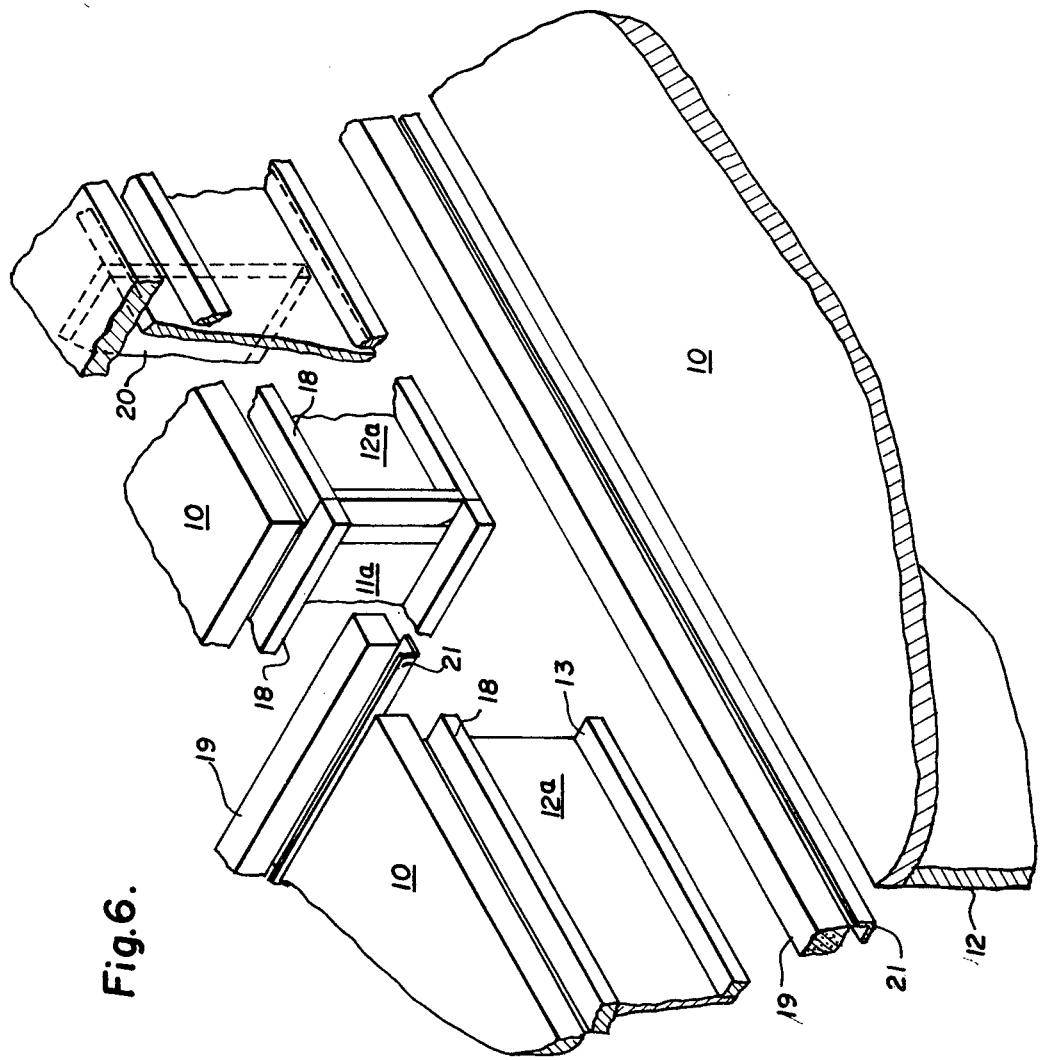
FIGURE 6 is an exploded segmental view of a joint between several separate lining plates according to our invention.

Referring to FIGURE 7 we have illustrated a form of shim or keeper 30 having an elastomer liner 31, preferably adhered thereto for use in place of shim 21 of FIGURES 1–6. This is particularly advantageous where high pressures are encountered and the joint must be made watertight.

While we have illustrated and described certain preferred practices and embodiments of our invention, it will be understood that this invention may be otherwise embodied within the scope of the following claims.

We claim:
1. A tunnel liner comprising a plurality of rectilinear arcuate side-by-side members forming a cylinder, said arcuate members having flanges extending generally normal to said rectilinear members adjacent all edges, said flanges having, at least along two adjacent edges of said rectilinear members, spaced ribs parallel to said members and being spaced with respect to said edges so as to form a substantially closed well between the flanges and ribs of adjacent members and a sealant under compression and confinement in said well, said arcuate members being drawn together at the flanges substantially to close the periphery of said well and confine the sealant on all sides, means acting on said flanges to draw them together, and a keeper means in said well at the junction of the said members overlying the adjacent members and the joint to prevent extrusion of sealant under pressure.

2. A tunnel liner as claimed in claim 1 wherein an L-shaped keeper is provided in said well over the sealant and bearing on the adjacent surfaces of adjoining members.

3. A tunnel liner as claimed in claim 1 wherein said arcuate members are drawn together at the flanges by bolts passing through holes in said flanges to place the sealant under compression.

4. A tunnel liner as claimed in claim 3 wherein the sealing means is a chemical sealant capable of swelling on contact with water adjacent the joint between the members.

5. A tunnel liner as claimed in claim 1 wherein the keeper is provided with an adjacent elastomer member overlying said keeper and extending over its edges in contact with the members being joined.

References Cited
UNITED STATES PATENTS

| 2,015,102 | 9/1935 | Doig | 61—45 |
| 3,396,543 | 8/1968 | White | 61—45 |

JACOB SHAPIRO, Primary Examiner

U.S. Cl. X.R.

52—393, 586; 106—287; 114—86